United States Patent
Rahmani Nezhad

(10) Patent No.: US 9,656,877 B2
(45) Date of Patent: May 23, 2017

(54) PREPARING LAYERED DOUBLE HYDROXIDE NANOSTRUCTURES

(71) Applicant: Cobra Rahmani Nezhad, Aligudarz (IR)

(72) Inventor: Cobra Rahmani Nezhad, Aligudarz (IR)

( * ) Notice: Subject to any disclaimer, the term of this patent is extended or adjusted under 35 U.S.C. 154(b) by 0 days.

(21) Appl. No.: 14/867,285

(22) Filed: Sep. 28, 2015

(65) Prior Publication Data
US 2016/0016811 A1    Jan. 21, 2016

Related U.S. Application Data

(60) Provisional application No. 62/055,664, filed on Sep. 26, 2014.

(51) Int. Cl.
| | |
|---|---|
| *C01G 3/02* | (2006.01) |
| *B01J 23/89* | (2006.01) |
| *B01J 47/00* | (2017.01) |
| *C08K 3/22* | (2006.01) |
| *C01G 3/00* | (2006.01) |

(52) U.S. Cl.
CPC ............ *C01G 3/02* (2013.01); *B01J 23/8993* (2013.01); *B01J 47/00* (2013.01); *C01G 3/00* (2013.01); *C01G 3/006* (2013.01); *C08K 3/22* (2013.01); *C01P 2002/22* (2013.01); *C01P 2002/72* (2013.01); *C01P 2002/82* (2013.01); *C01P 2002/85* (2013.01); *C01P 2002/88* (2013.01); *C01P 2004/03* (2013.01); *C01P 2004/04* (2013.01); *C08K 2003/2224* (2013.01); *C08K 2003/2227* (2013.01); *C08K 2003/2248* (2013.01); *C08K 2003/2251* (2013.01); *C08K 2003/2265* (2013.01)

(58) Field of Classification Search
CPC ... C01G 3/02; C01G 3/00; C01G 3/006; B01J 47/00; B01J 23/8993; C08K 3/22; C08K 2003/2248; C08K 2003/2265; C08K 2003/2224; C08K 2003/2227; C01P 2002/82; C01P 2002/85; C01P 2002/72; C01P 2002/88; C01P 2004/03; C01P 2004/04; C01P 2002/22; A61K 47/02
See application file for complete search history.

(56) References Cited

U.S. PATENT DOCUMENTS

2004/0219089 A1 * 11/2004 Kuhlmann .............. B01J 41/10
                                                                423/395
2008/0293957 A1    11/2008 Winters et al.

FOREIGN PATENT DOCUMENTS

JP        2003160332 A  *  6/2003

OTHER PUBLICATIONS

English machine translation of JP2003160332A.*
(Continued)

*Primary Examiner* — Richard M Rump
(74) *Attorney, Agent, or Firm* — NovoTechIP International PLLC

(57) ABSTRACT

Provided is a method for manufacturing nanostructured layered double hydroxides (LDHs) having a uniform size distribution with homogenous nano-disc morphology. Disclosed method has three main steps of: pretreatment of metal wires; wire-explosion in a liquid phase; and finally, centrifugation and drying the as-prepared colloidal products to obtain the LDHs nanostructured dried powder.

25 Claims, 10 Drawing Sheets

(56) References Cited

OTHER PUBLICATIONS

Yokoi, Taishi, and Masanobu Kamitakahara. "Formation of Stacked Disc-shaped Layered Double Hydroxides by Homogeneous Precipitation Method." Chemistry Letters 43.2 (2014): 234-236.*

Wonbaek Kim, Fabrication of alloy nanopowders by the electrical explosion of electrodeposited wires, Materials Letters, vol. 61, Issue 21, Aug. 2007, pp. 4259-4261.

Satoru Ishihara, Synthesis of intermetallic NiAl compound nanoparticles by pulsed wire discharge of twisted Ni and Al wires, Intermetallics, vol. 23, Apr. 2012, pp. 134-142.

L.H. Bac, Synthesis and characteristic of FeNi3 intermetallic compound obtained by electrical explosion of wire, Materials Research Bulletin, vol. 45, Issue 3, Mar. 2010, pp. 352-354.

Yun Zhao, Preparation of Layered Double-Hydroxide Nanomaterials with a Uniform Crystallite Size Using a New Method Involving Separate Nucleation and Aging Steps, Chemistry of Materials, vol. 14, Issue 10, 2002, pp. 4286-4291.

\* cited by examiner

PREPARING LAYERED DOUBLE HYDROXIDE NANOSTRUCTURES

CROSS REFERENCE TO RELATED APPLICATION

The present application claims priority from U.S. Provisional Patent Application Ser. No. 62/055,664, filed Sep. 26, 2014, entitled "A Method for Production of Double Hydroxide Layered Nanostructures", the entire content which is incorporated herein by reference.

SPONSORSHIP STATEMENT

This application has been sponsored by the Iranian Nanotechnology Initiative Council, which does not have any rights in this application.

TECHNICAL FIELD

The present application generally relates to a method for preparation of layered double hydroxides (LDHs) nanostructures. More specifically, the present application relates to a method for LDHs nanostructures synthesis having a uniform size and morphology, assisted by the electrical explosion of wires (designated hereinafter as "EEW") technique.

BACKGROUND

LDHs nanostructures are a class of layered compounds, which include cationic double hydroxide layers and charge balancing interlayer anions. Recently, nanostructured LDHs have received much attention due to their special characteristics in a wide range of applications, such as catalysis, photochemistry, electrochemistry, polymerization, magnetization, drug delivery, water treatment, ion-exchange removal of toxic ions, $CO_2$ capture, as a layered host for storage/delivery of biologically active molecules, plastics additives, etc.

Common synthesis methods such as sol-gel, co-precipitation, hydrothermal, and mechanochemical methods have been used for synthesis of different nanostructured LDHs (e.g. Mg/Al, Co/Al, Zn/Al, etc.) over the known prior art (see, e.g., Gillman et al., U.S. Pat. No. 2007/0053821; Winters et al., U.S. Pat. No. 7,968,740; Coen et al., Pat. No. WO 2008/113793; Schomaker et al., Pat. No. EP2261177; O'Hare et al., Pat. No. WO2012/150439). But, all of the aforementioned methods are time-consuming and involve complicated process conditions, such as temperature and pH control. In addition, the methods proposed in the prior art have multiple steps, which require various equipment and materials. Furthermore, in the previous methods, chemical compounds are used as the source of cations, which might be costly for large scale production of LDHs.

Therefore, according to the aforementioned wide range precious applications of LDHs nanostructures, there is a present need for an improved technique, which is efficient, cost-effective and enables mass production of these compounds.

SUMMARY

In one general aspect, the instant application describes a simple, cost-effective and time-saving method for the preparation of high-purity LDHs nanostructures having a uniform size and morphology. The method is assisted by the electrical explosion of wires (designated hereinafter as "EEW") technique.

The LDHs nanostructures, prepared pursuant to the teachings of the present application, are layered structures, which include two metal hydroxide layers with an anion(s) interlayer. The metal element of one layer includes monovalent or divalent metal hydroxides and the metal element of the other layer includes trivalent metal hydroxides.

The monovalent/divalent metal cations may be one of the cations of $Li^+$, $Zn^{2+}$, $Mg^+$, $Cu^{2+}$, $Fe^{2+}$, $Co^{2+}$, $Ni^{2+}$, $Ca^{2+}$ and $Mn^{2+}$. In addition, the trivalent metal cations can be one of the cations of $Al^{3+}$, $Fe^{3+}$, $Gd^{3+}$, $Cr^{3+}$, $Co^{3+}$, $In^{3+}$, $Ga^{3+}$ and $Mn^{3+}$. The anion interlayer may include at least one of the anions of $NO_3^-$, $Br^-$, $F^-$, $OH^-$, $SO_4^{2-}$, $CO_3^{2-}$, $ClO_3^-$ and $ClO_4^-$.

The aforementioned layered double hydroxides (LDHs) nanostructures, prepared pursuant to the teachings of the present application are preferably prepared through a method having three main steps: first, preparation of two metal wires via the steps of thinning, staining and weaving (or twisting) of the metal wires; second, exploding the prepared wires by a wire-explosion process in a liquid phase; and third, centrifugation and drying the as-prepared colloidal product.

In one implementation of the present application, the staining treatment is done using a staining material selected from the group consisting of drawing oils, lubricant oils/materials, simple paraffins, natural oils, and mixtures thereof. It should be considered that since the interlayer anion is entered into the LDH structure by the staining material, the aforementioned material selection depends on the desired anion type.

After the metal wires preparation, the woven (twisted) wires are loaded in an EEW setup comprising two electrodes conducting a voltage of 500 V in deionized water. Thereafter, an appropriate length of woven (twisted) metal wires (i.e. about 2 cm) is put between two electrodes and multiple sparks are applied so that a colloidal product of LDHs is obtained. The as-prepared colloids are centrifuged and dried to a dry solid powder of LDHs.

In one implementation of the present application, a series of analysis methods and techniques are considered to prove the existence of LDHs nanostructures in the final product and their characteristics, as described in detail hereinbelow.

BRIEF DESCRIPTION OF THE DRAWINGS

While the specification concludes with claims particularly pointing out and distinctly claiming the subject matter that is regarded as forming the present application, it is believed that the application will be better understood from the following description taken in conjunction with the accompanying DRAWINGS, where like reference numerals designate like structural and other elements, in which:

DETAILED DESCRIPTION

Figure 1A:
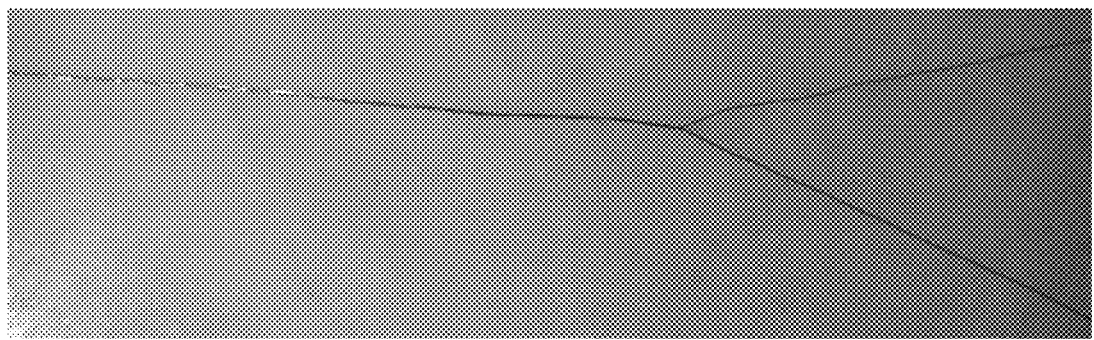
FIG. 1A illustrates an image of exemplary metal wires during the weaving stage pursuant to the teachings of the present application.

The following detailed description is presented to enable a person skilled in the art to make and use the application. For purposes of explanation, specific nomenclature is set forth to provide a thorough understanding of the present application. However, it will be apparent to one skilled in the art that these specific details are not required to practice the application. Descriptions of specific applications are provided only as representative examples. Various modifications to the preferred implementations will be readily apparent to one skilled in the art, and the general principles defined herein may be applied to other implementations and applications without departing from the scope of the application. The present application is not intended to be limited to the implementations shown, but is to be accorded the widest possible scope consistent with the principles and features disclosed herein.

In one implementation, the teachings of the present application may overcome the limitations and difficulties involved in the common methods for synthesis of LDH nanostructured compounds. To this end, a method is disclosed for nanostructured LDH preparation with desired uniform characteristics, such as shape, morphology and size distribution. The method may be efficient and appropriate for large-scale production compared to the methods described in the background section of the instant application.

The method may be assisted by EEW technique. The EEW technique has been used before for synthesizing various nanoparticles in the prior art. In the EEW technique, a high magnitude of current passes through a metal wire in a short time and converts the wire into a vapor state. The vaporized metal is then cooled down instantaneously to form nanoparticles. According to the process requirements and characteristics, high production rate and short reaction time can be mentioned as the advantages of EEW technique. Furthermore, this technique does not require expensive chemical materials and also expensive process equipment, such as vacuum pumps, lasers, etc. Therefore, nanoparticles produced by an EEW method could be easily commercialized. It should be mentioned that there are not any reports on the synthesis of LDHs by EEW method in the prior art.

Accordingly, metallic wires are used as the main starting materials in the present application. The metallic wires may be low-cost, available and nonchemical substances. The method of instant application may be advantageous over the common methods for synthesis of LDH nanostructured compounds discussed in the background section. For example, the reaction time in the present application may be considerably short and the method may be performed within a few seconds. In contrast, the common methods for synthesis of LDH nanostructured compounds are time consuming and the reaction time in these methods varies between about 2 hours to 3 days. Furthermore, the common methods discussed in the background section involve different steps, such as milling and mixing, and they require a complex process control. In contrast, controlling the process conditions of the method introduced in this application is simple. Furthermore, the method disclosed herein is more suitable for continuous operations, due to its feeding system characteristics. Additionally, various types of LDHs nanostructures can be produced by the present method simply by changing the type of wires fed to the process, but in chemical methods described in the background section, changing the reactions is far more complicated.

In one implementation, the LDH prepared by the method of the present application has the general formula: $[M^{z+}_{1-x} M^{3+}_x (OH)_2][Ac^{n-}_{q/n} \cdot yH_2O]$. In this formula, $M^{z+}$ represents a monovalent or divalent metal, $M^{3+}$ represents a trivalent metal, $A^{n-}$ represents an anion of a valence of n, y is a real number larger than 0, q equals to 2x+1 for monovalent metals, and x for divalent metals, and x is a number less than 1.

The method for preparing the aforementioned LDHs may include three main steps. The first step includes preparation of two metal wires via three steps of thinning, staining and weaving (twisting) of the metal wires. The second step includes exploding the prepared wires by a wire-explosion process in a liquid phase. The third step includes centrifugation and drying the as-prepared colloidal product, as discussed in more detail hereinbelow. Since the method described herein comprises of a wire-explosion step, the metals are provided in the form of a wire in an implementation of the present application in order to allow the flow of current to be uniform within the metal raw materials. In one implementation of the present application, two metal wires are monovalent/divalent and trivalent metals, as mentioned hereinabove. That means, for example, if Al—Cu LDHs are considered to be synthesized, accordingly Al and Cu wires are used.

In one implementation of the present application, the aforementioned monovalent/divalent metal wire may be supplied from the group of $Li^+$, $Zn^{2+}$, $Mg^{2+}$, $Cu^{2+}$, $Fe^{2+}$, $Co^{2+}$, $Ni^{2+}$, $Ca^{2+}$ and $Mn^{2+}$. In another implementation of the present application, the metal material of the trivalent metal can be provided from the group of $Al^{3+}$, $Fe^{3+}$, $Gd^{3+}$, $Cr^{3+}$, $Co^{3+}$, $In^{3+}$, $Ga^{3+}$ and $Mn^{3+}$.

According to the first step of the present application, the preparation of wires is carried out via three consecutive steps or stages of: (a) thinning; (b) staining; and (c) weaving (twisting) the metal wires. It should be understood that the metal wires should be thinned to obtain the desirable diameter for use in the EEW process, herein as the first pretreatment stage of supplied wires. The thinning of the wires may be done using a Durston-rolling-milland draw-plates device to achieve the desired diameter, which is preferably about 0.1 mm.

An anion interlayer may be present between two metal hydroxide layers in the obtained LDH nanostructures, pursuant to the present application, as shown above in the general formula. Accordingly, in the second step of the pretreatment of the wires, the thinned wires are stained by specific materials, as the source of interlayer anions, so that a thin layer of the material will cover the surface of the wires. In one implementation of the present application, the anion interlayer can be selected from a group consisting of $NO_3^-$, $Br^-$, $F^-$, $OH^-$, $SO_4^{2-}$, $CO_3^{2-}$, $ClO_3^-$ and $ClO_4^-$. The interlayer anion is entered into the LDH structure via the staining step.

In an implementation of the present application, where carbonate interlayer anions are considered to be formed in a LDH nanostructure, different kinds of hydrocarbons can be used as the staining substance. For example, the low-cost drawing oils, which are usually oriented from natural hydrocarbons and are used commonly as lubricants, can be used as the staining substance. Accordingly, various types of materials, which contain the desirable anions may be used as the staining substance. Preferably, different types of oils, such as drawing oils, lubricant oils or materials, simple paraffins, and generally various types of natural oils would be appropriate as the aforementioned staining substance.

In one implementation of the present application, the staining stage may be carried out via different methods, such as spraying the staining material onto the surfaces of the wires, submerging the wires in the staining material, drawing the wires through the staining material, etc.

Weaving (twisting) of the metal wires is the third and the final stage or step of the pretreatment of the wires, before the explosion. The stained wires should be woven (twisted) tightly, so that the staining substance sticks between the wires. For example, an armature or any electrical motor can be simply used for the weaving (twisting) of wires.

Figure 1B:
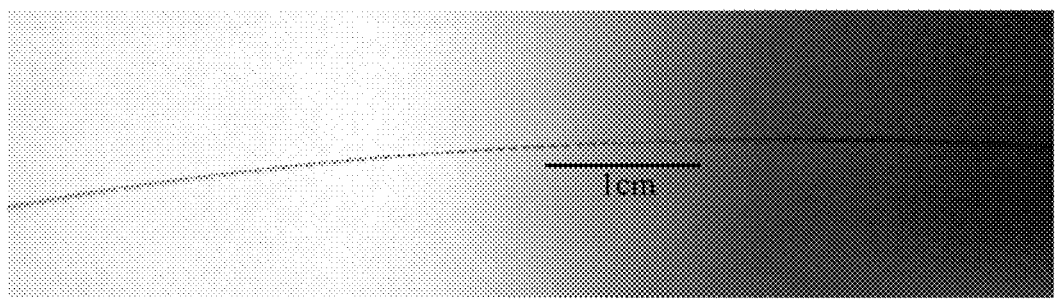
FIG. 1B illustrates an image of the woven metal wires.
Figure 1C:
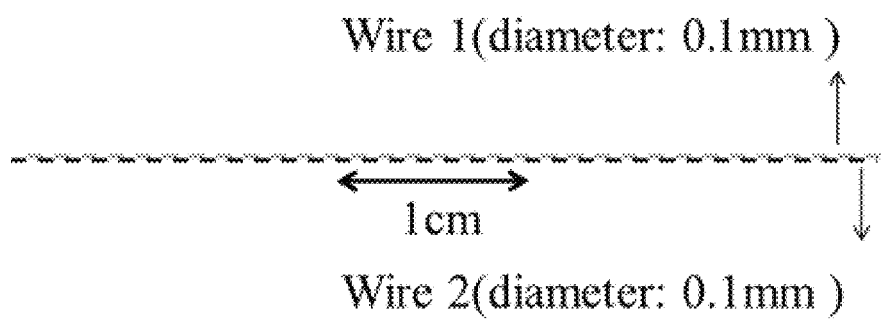
FIG. 1C illustrates a schematic representation of woven wires illustrating the obtained scales and dimensions.

FIG. 1A illustrates an image of two wires during weaving (the twisting process). FIG. 1B illustrates an image of two woven (twisted) wires. FIG. 1C illustrates a schematic of the woven (twisted) wires, representing the shape of tightly woven wires, and corresponding scales and dimensions.

In an implementation of the present application, the aforementioned staining and weaving (twisting) steps or stages are done simultaneously. For this purpose, two metal wires are weaved (twisted) tightly, using a low speed electric motor, while, they are immersed in a vessel, containing the staining material solution.

Figure 2:
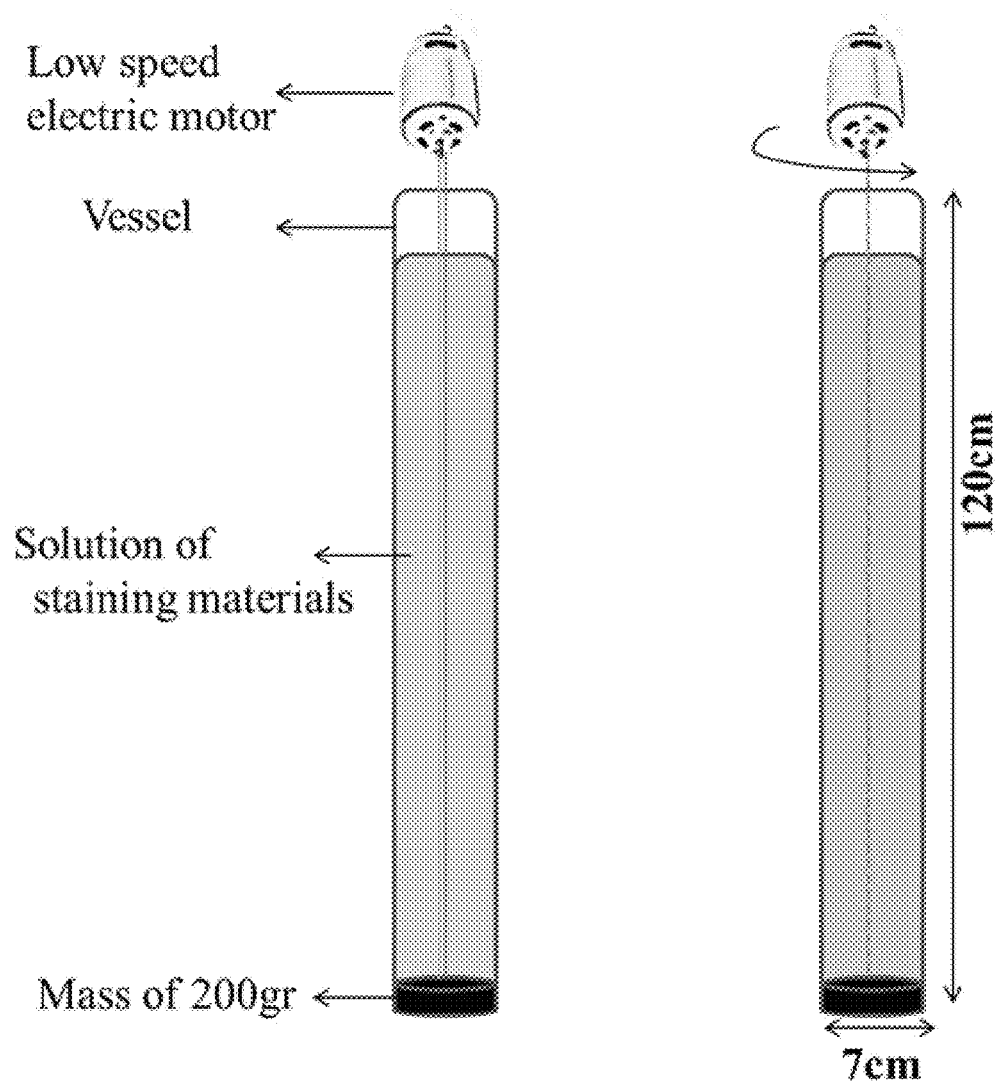
FIG. 2 illustrates exemplary simultaneous staining-weaving stages for two metal wires, pursuant to the teachings of the present application.

FIG. 2 illustrates the aforementioned simultaneous staining-weaving (twisting) step or stage for two metal wires. It is understood by a person skilled in the art that the applied method herein is not restricted or limited to any certain types of metal wires and it can be used for all types of metal wires.

After the preparation of the desired stained woven (twisted) metal wires, the woven (twisted) wires are exploded electrically to obtain the nanostructured LDHs product. Accordingly, the second main step of the present method is done by the well-known electrical explosion of wires (designated hereinafter as "EEW") technique. Therefore, the prepared wires according to the triple stages described above are loaded into a wire-explosion setup (PNC1k, Nano Engineering and Manufacturing Co. (PNF Co.), Iran).

In one implementation, the explosion of the woven (twisted) wires is done in a vessel containing about 1 L of a liquid, which is preferably deionized water. In another implementation, the explosion is conducted with a voltage of about 500V onto a length of about 2.5 cm of the woven (twisted) wires. The aforementioned voltage is applied between two electrodes, which are placed in the aforementioned liquid phase preferably at a distance of about 2 cm from each other.

In the present procedure, the as-prepared wires are exposed to electrical explosion for several times through multiple sparks. Thereupon, a colloidal product of LDHs nanostructure is obtained. The colloidal product becomes more concentrated by applying every spark.

Regarding the final step or stage of the method for the production of LDH nanostructures in the present application, the aforementioned resultant colloidal product containing LDHs is centrifuged, and then, dried to obtain a dry powder of the LDH nanostructures. The centrifugation stage may be done at a speed of about 3500 rpm to obtain a high concentrated colloidal solution. The centrifuged product may be freeze dried. The aforementioned drying stage is carried out in a freeze dryer device preferably at a temperature of about −35° C. and a pressure of less than about 1 mbar for about 7 hours.

An exemplary technique for the production of nanostructured LDHs by an EEW method, pursuant to the teachings of the present application is set forth hereinbelow. It should be understood that this example is illustrative only, and similar techniques for the production of the preferred nanostructured LDHs of the instant application are thus possible with different parameters, as is all well understood to those of skill in the art. The examples should not be deemed as limiting the scope of the present application. The only limitations of the scope of the instant case are set forth in the claims appended hereinbelow.

Example 1: Synthesis of Al—Cu LDHs

In this exemplary implementation of the present application, initially Al and Cu wires were thinned to a diameter of about 0.1 mm and stained by drawing oil (CM201 for Cu and M401 for Al) to coat the wires by a uniform thin layer of the aforementioned oils. Then, the stained wires were woven (twisted) tightly, using an armature, so that the drawing oil is stuck between the wires. Referring again to FIG. 1C, the exemplary schematic of the woven (twisted) wires shows that, the average diameter of the wires is about 0.1 mm, and the twisting number per 10 mm is about 6 turns.

Then, the woven (twisted) wires were loaded in an EEW setup and exploded in about 1 L of deionized water. Here, a voltage of 400V is continuously applied, and in every spark, the produced colloidal LDHs nanostructures became more concentrated. Thereafter, the prepared colloidal product was centrifuged at about 3600 rpm, and then freeze dried so that a solid powder was obtained. The shape, morphology and the size range of the prepared products were investigated by SEM and TEM analyses.

Figure 3:
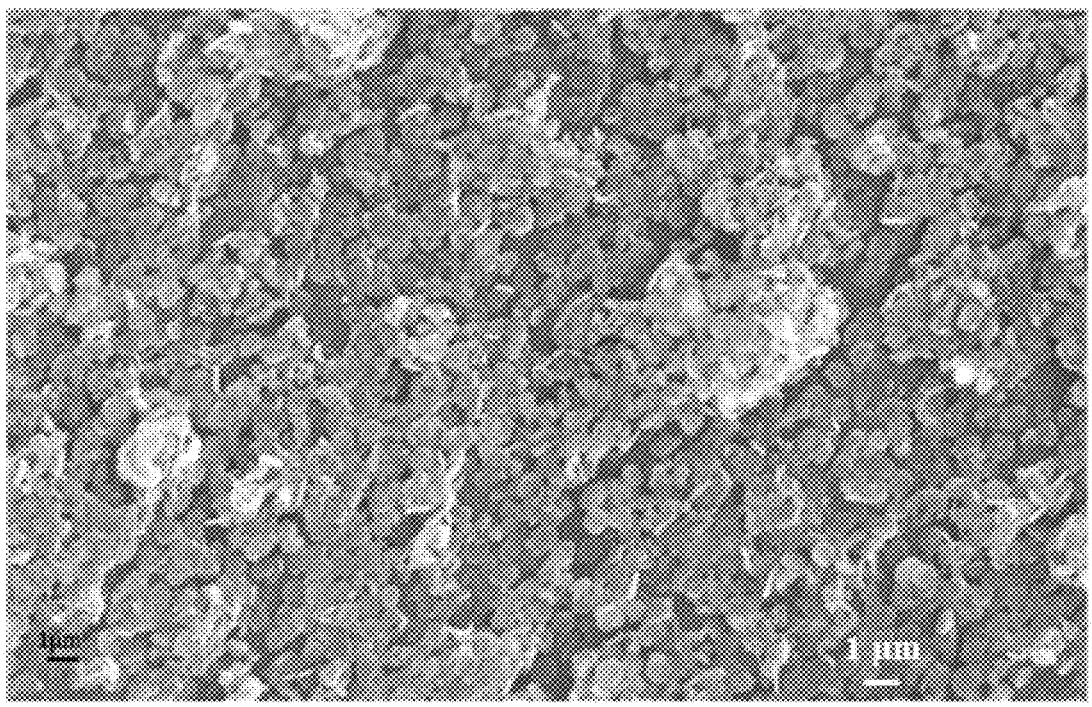
FIG. 3 illustrates a scanning electron microscope (SEM) image of synthesized Al—Cu LDH nano-discs, prepared pursuant to the teachings of the present application.
Figure 4:
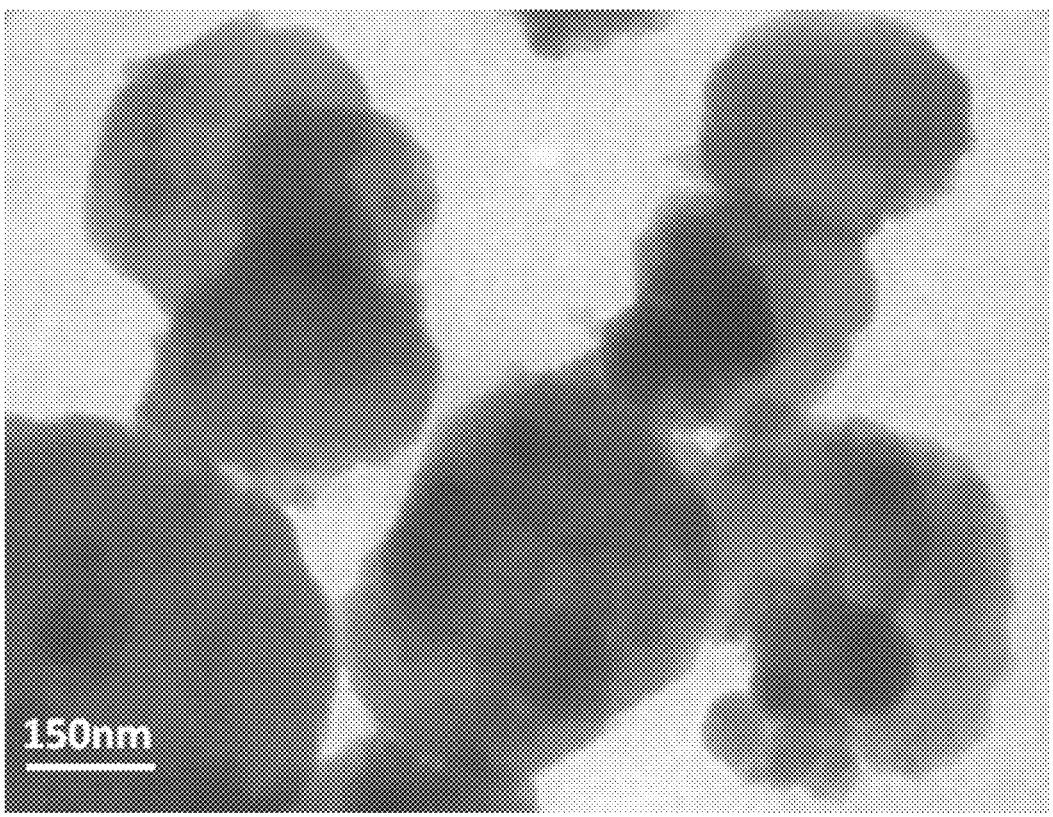
FIG. 4 illustrates a transmission electron microscope (TEM) image of synthesized Al—Cu LDH nano-discs, prepared pursuant to the teachings of the present application.

FIGS. 3 and 4 respectively illustrate SEM and TEM images of the as-prepared samples. As shown in these figures, the resultant products are formed in a uniform nano-disc morphology, which is expected for LDHs nanostructures according to the prior art. Furthermore, these images reveal that the resultant LDH nano-discs have a uniform size distribution.

Figure 5:
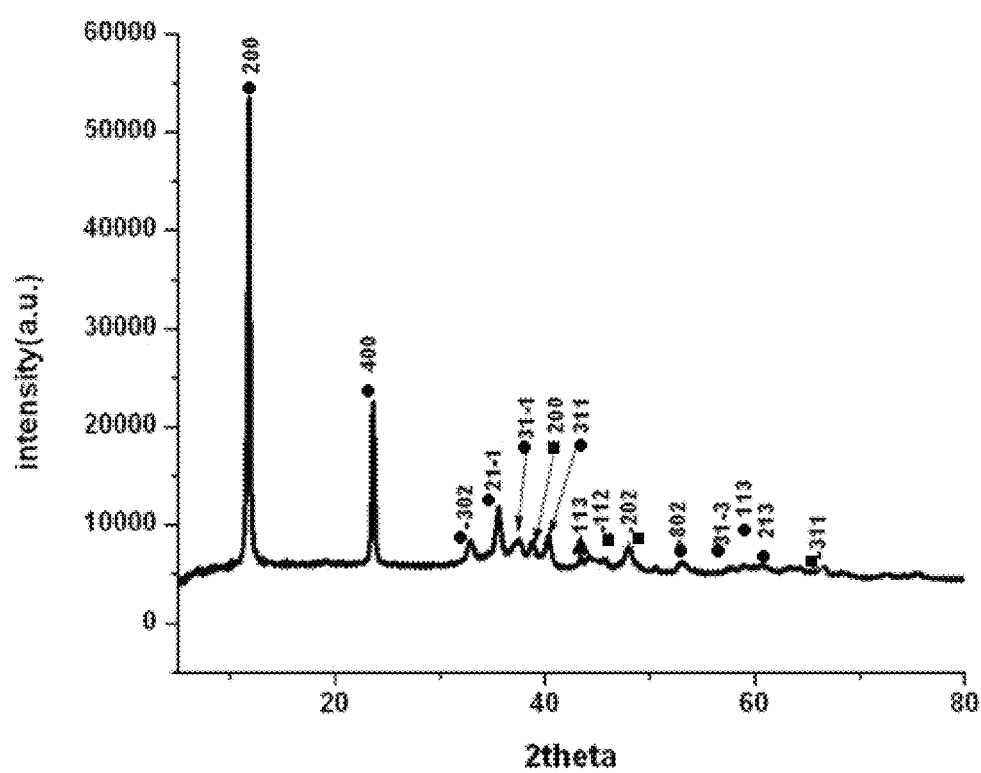
FIG. 5 illustrates an X-Ray Diffraction (XRD) pattern of an exemplary Al—Cu LDH sample, prepared pursuant to the teachings of the present application: the peaks related to copper aluminum carbonate hydroxide hydrate (standard card: 00-046-0099) are designated by the symbol (●), the peaks related to copper oxide (standard card: 00-005-00661) are designated by the symbol (■), the peaks related to aluminum oxide (standard card: 00-010-0173) are designated by the symbol (▲)

FIG. 5 illustrates the XRD pattern of the obtained nanostructures. The XRD pattern of obtained nanostructures is in agreement with the patterns reported in the prior art for copper aluminum carbonate hydroxide hydrate known as standard card: 00-046-0099 (designated by the symbol of (●) in FIG. 5). As can be seen in this figure, there are some weak peaks related to copper oxide and aluminum oxide, which are formed as the by-product of the process in a few amounts (the peaks related to copper oxide (i.e. standard card: 00-005-00661) are designated by the symbol (■), the peaks related to aluminum oxide (i.e. standard card: 00-010-0173) are designated by the symbol (▲) in FIG. 5).

Furthermore, the products composition was studied by energy-dispersive X-ray spectroscopy (EDX) and CHN (for carbon, hydrogen and nitrogen elements) analysis techniques and the obtained results are presented in Tables 1 and 2 hereinbelow. The resultant compositions of the EDX and CHN analyses confirm the presence of Al, Cu, C, O and H in products, which is expected when Al—Cu LDHs structures are formed.

TABLE 1

The elemental composition analysis results investigated by energy-dispersive Xray spectroscopy (EDX) technique

| Element | Line | Intensity | Error | K | Kr (K-ratio) | Weight percentage (Wt. %) | Atomic Percentage (At. %) | ZAF correction factors | Ox % | Pk/Bg |
|---|---|---|---|---|---|---|---|---|---|---|
| C | Kα | 57.6 | 29.7144 | 0.0308 | 0.0190 | 7.81 | 17.78 | 0.2435 | 0.00 | 10.28 |
| O | Kα | 847.9 | 29.7144 | 0.2262 | 0.1396 | 32.21 | 55.01 | 0.4334 | 0.00 | 54.35 |
| Mg | Kα | 43.2 | 29.7144 | 0.0041 | 0.0025 | 0.53 | 0.59 | 0.4815 | 0.00 | 2.68 |
| Al | Kα | 1053.2 | 29.7144 | 0.0985 | 0.0608 | 10.21 | 10.33 | 0.5955 | 0.00 | 16.81 |
| Cr | Kα | 25.1 | 0.9823 | 0.0081 | 0.0050 | 0.54 | 0.28 | 0.9268 | 0.00 | 2.60 |
| Fe | Kα | 67.8 | 0.9823 | 0.0314 | 0.0194 | 2.02 | 0.99 | 0.9627 | 0.00 | 3.95 |
| Cu | Kα | 452.2 | 0.6945 | 0.4252 | 0.2624 | 29.34 | 12.62 | 0.8942 | 0.00 | 22.44 |
| Au | Lα | 16.9 | 0.6945 | 0.1756 | 0.1084 | 17.35 | 2.41 | 0.6247 | 0.00 | 3.02 |
| | | | | 1.000 | 0.6171 | 100.00 | 100.00 | | 0.00 | |

TABLE 2

The elemental composition analysis results obtained by CHN technique

| | Retention Time [min] | Response | Weight [mg] | Weight [%] | Peak Type | Element Name |
|---|---|---|---|---|---|---|
| 1 | 1.457 | 12.547 | 0.004 | 0.37 | Refer | Nitrogen |
| 2 | 2.523 | 327.567 | 0.041 | 3.81 | Refer | Carbon |
| 3 | 7.670 | 572.323 | 0.024 | 2.25 | Refer | Hydrogen |
| | Total | | 1.069 | 6.43 | | |

Figure 6:
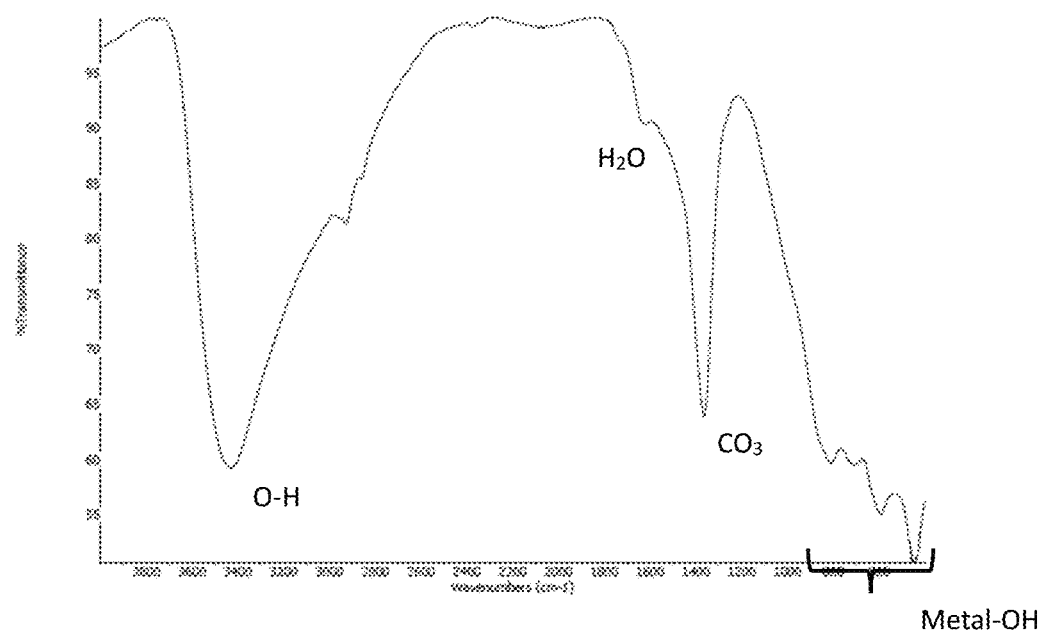
FIG. 6 illustrates Fourier-transform infrared (FT-IR) spectra of synthesized Al—Cu LDHs, prepared pursuant to the teachings of the present application.

FIG. 6 illustrates that the LDHs structure formation is proved by the illustrated FT-IR spectra of the sample products. As shown in this figure, the FT-IR studies have been performed in the range of about 400 to 4000/cm$^{-1}$ for identification of the functional groups and/or bonds in the synthesized LDH nanostructures. The peaks observed at 3431.85, 1363.85, 1670 cm$^{-1}$ can be assigned to the OH$^-$, CO$_3^{-2}$ and H$_2$O respectively. Accordingly, the Peaks at 809.10, 707.34, 592.52, 445.17 cm$^{-1}$ correspond to the cation-OH bonds.

Thermal behavior of the products was studied through a differential temperature analysis/thermo-gravimetry analysis (DTA/TGA).

Figure 7:
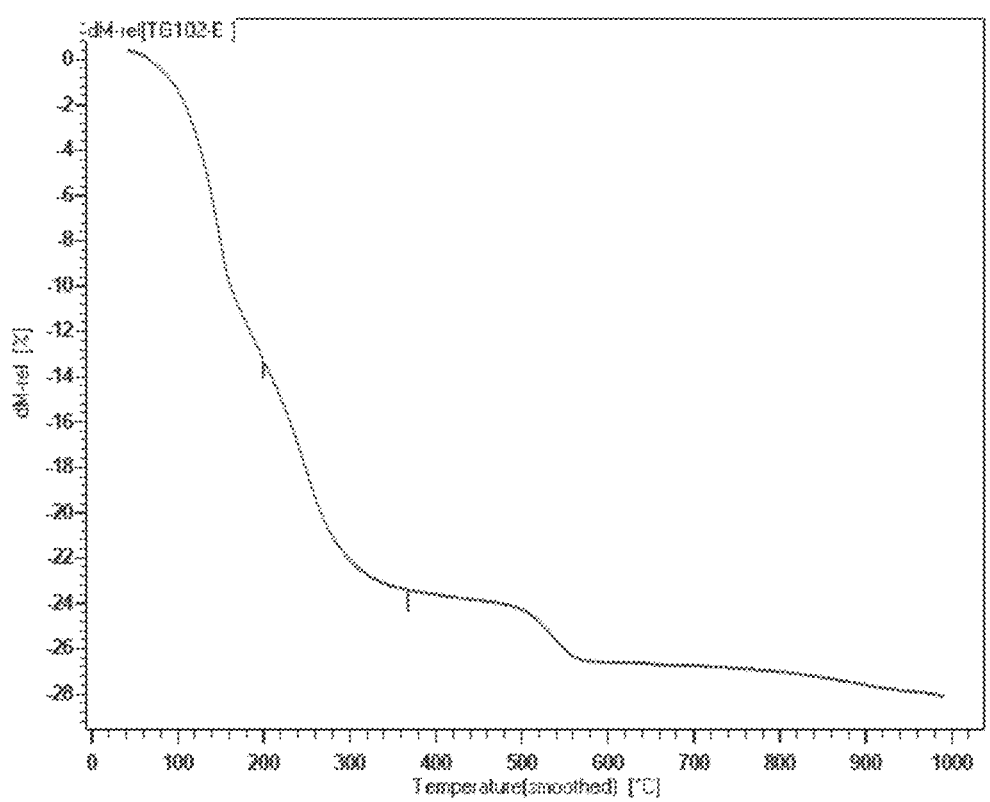
FIG. 7 illustrates a thermo-gravimetry analysis (TGA) curve of synthesized Al—Cu LDHs, prepared pursuant to the teachings of the present application.
Figure 8:
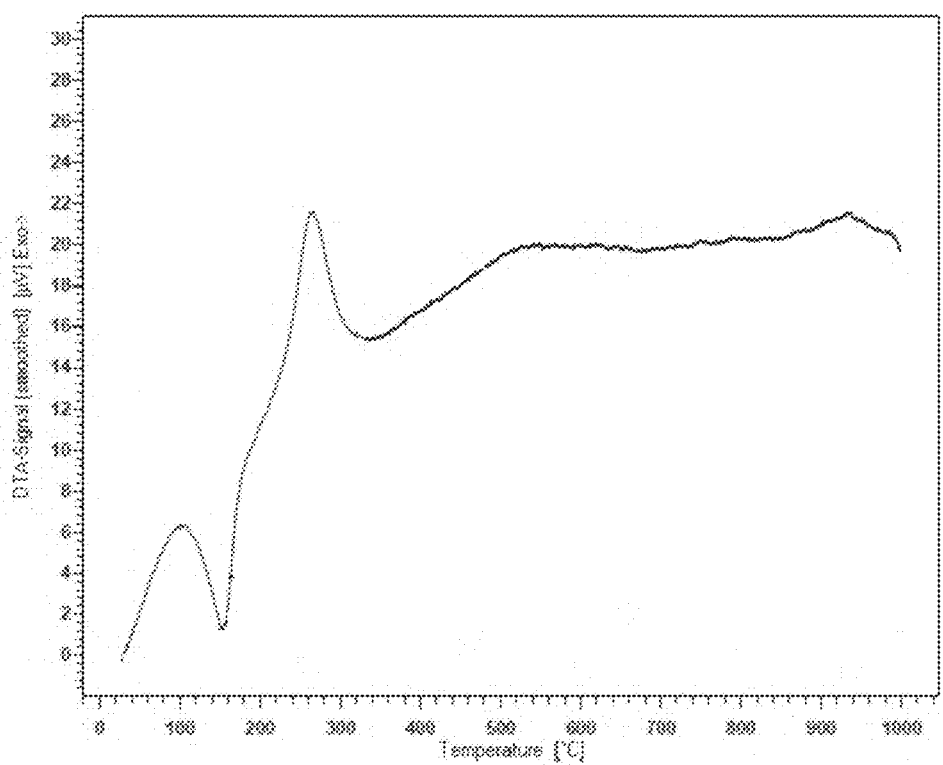
FIG. 8 illustrates a differential temperature analysis (DTA) curve of synthesized Al—Cu LDHs, prepared pursuant to the teachings of the present application.

FIGS. 7 and 8 of the DRAWINGS show the aforementioned TGA and DTA results for the prepared LDHs, respectively. Thermal behavior of the obtained products confirmed that synthesized nanostructures are exactly Al—Cu LDHs. In addition, TGA analysis of the products agrees very well to Al—Cu LDHs studied previously elsewhere in the prior art.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method for preparation of a nanostructured layered double hydroxide (LDH) by electrical wire explosion, method comprising steps of:
preparing metal wires by:
thinning the metal wires,
staining the metal wires with a staining material, and
twisting the metal wires;
exploding the prepared metal wires in a liquid phase; and
centrifugation and drying a colloidal product obtained in the exploding step.

2. The method according to claim 1, wherein:
the metal wires include two metal wires, and
the thinning the two metal wires include thinning the two metal wires using a Durston-rolling-mill and drawplates device.

3. The method according to claim 1, wherein the thinning the metal wires include thinning the metal wires to a diameter of about 0.1 mm.

4. The method according to claim 1, wherein the staining the metal wires includes staining the metal wires via a spraying device.

5. The method according to claim 1, wherein the staining the metal wires includes staining the metal wires by submerging the wires in a staining material.

6. The method according to claim 1, wherein the staining the metal wires includes staining the metal wires by drawing the metal wires through a staining material.

7. The method according to claim 4, wherein the staining material is selected from a group consisting of a drawing oil, a lubricant material, a paraffin, a natural oil, or mixtures thereof.

8. The method according to claim 1, wherein the staining and twisting steps are carried out consecutively or simultaneously.

9. The method according to claim 1, wherein:
the metal wires include two metal wires, and
the twisting of two metal wires includes twisting the two metal wires by an electrical motor.

10. The method according to claim 1, wherein the exploding step includes steps of:
loading the prepared metal wires into an exploding vessel comprising a liquid phase;
applying a constant voltage between two electrodes; and
applying multiple sparks to a section of the prepared metal wires between the electrodes.

11. The method according to claim 10, wherein the constant voltage is about 500 V.

12. The method according to claim 10, wherein the liquid phase is deionized water.

13. The method according to claim 10, wherein the two electrodes are located at a distance of about 2 cm from each other.

14. The method according to claim 10, wherein the applying the multiple sparks includes applying the multiple sparks at a length of the prepared metal wires of about 2.5 cm.

15. The method according to claim 1, wherein the drying step is a freeze-drying step.

16. The method according to claim 15, wherein the drying step is done at a temperature of about −35 C.

17. The method according to claim 15, wherein the drying step is done at a pressure of about 1 mbar or lower.

18. The method according to claim 15, wherein the drying step is done during a time of about 7 hours.

19. The method according to claim 1, wherein the preparation of the nanostructured layered double hydroxide (LDH) by electrical wire explosion results in a LDH composition having a general formula of:

wherein:
$M^{z+}$ is a monovalent or divalent metal,
$M^{3+}$ is a trivalent metal,
A is an anion,
y is >=0,
x is <1,
q equals to 2x+1 for monovalent metals and equals to x for divalent metals.

20. The method according to claim 19, wherein the monovalent metal is $Li^+$.

21. The method according to claim 19, wherein the divalent metal is selected from a group consisting of $Zn^{2+}$, $Mg^{2+}$, $Cu^{2+}$, $Fe^{2+}$, $Co^{2+}$, $Ni^{2+}$, $Ca^{2+}$ and $Mn^{2+}$.

22. The method according to claim 19, wherein the trivalent metal is selected from a group consisting of $Al^{3+}$, $Fe^{3+}$, $Gd^{3+}$, $Cr^{3+}$, $Co^{3+}$, $In^{3+}$, $Ga^{3+}$ and $Mn^{3+}$.

23. The method according to claim 19, wherein the anion is selected from a group consisting of $NO_3^-$, $Br^-$, $F^-$, $OH^-$, $SO_4^{2-}$, $CO_3^{2-}$, $ClO_3^-$, $ClO_4^-$, and combinations thereof.

24. The method according to claim 19, wherein the LDH composition is uniformly disc-shaped.

25. The method according to claim 19, wherein the LDH composition has a uniform thickness of about 1 micrometer or less.

* * * * *